(No Model.)

A. H. & T. A. SCHLUETER.
APPARATUS FOR AGITATING AND DISCHARGING LIQUIDS.

No. 512,489. Patented Jan. 9, 1894.

Witnesses,
Inventors,
Adolph H. Schlueter
Theodore A. Schlueter
By Dewey & Co. Attys.

United States Patent Office.

ADOLPH H. SCHLUETER AND THEODORE A. SCHLUETER, OF OAKLAND, CALIFORNIA.

APPARATUS FOR AGITATING AND DISCHARGING LIQUIDS.

SPECIFICATION forming part of Letters Patent No. 512,489, dated January 9, 1894.

Application filed May 24, 1893. Serial No. 475,376. (No model.)

*To all whom it may concern:*

Be it known that we, ADOLPH H. SCHLUETER and THEODORE A. SCHLUETER, citizens of the United States, residing at Oakland, Alameda county, State of California, have invented an Improvement in Apparatus for Agitating and Discharging Liquids; and we hereby declare the following to be a full, clear, and exact description of the same.

Our invention relates to an apparatus which is especially designed to promote the even discharge of liquids from containing vessels.

It consists in certain details of construction which will be more fully explained by reference to the accompanying drawings, in which—

Figure 1:
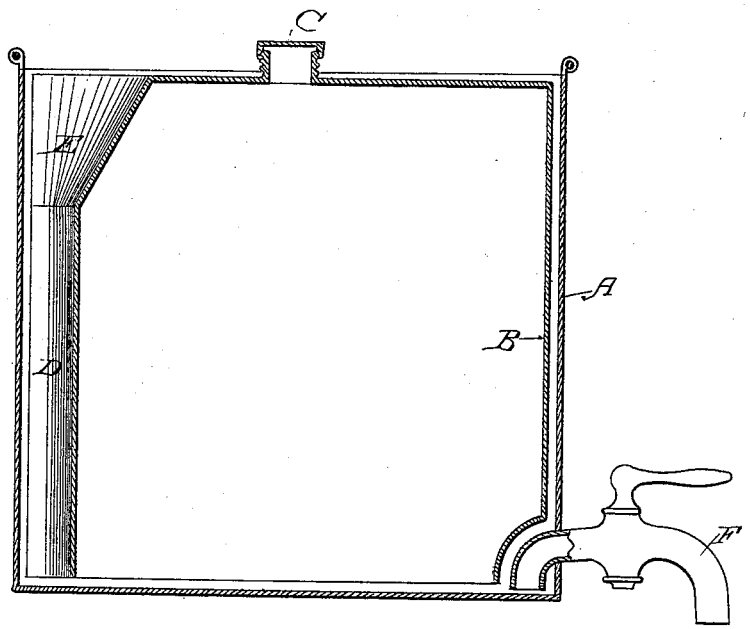
Figure 2:
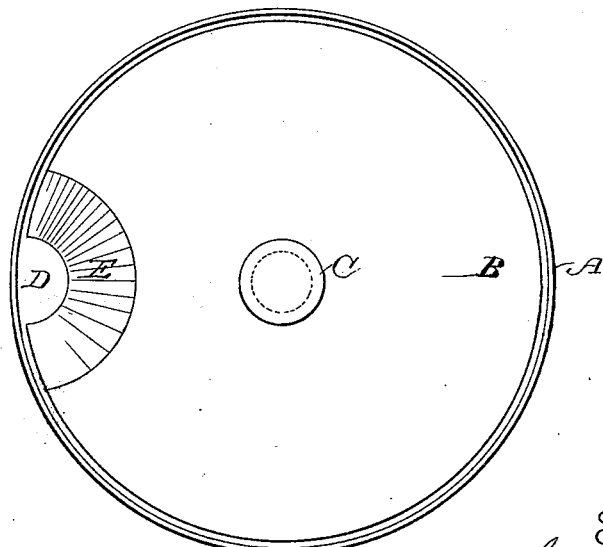

Figure 1 is a vertical section of our apparatus. Fig. 2 is a plan view.

The object of our invention is to provide an apparatus which is especially designed for containing milk or other liquids, the constituents of which are inclined to separate from each other when the liquid remains for a considerable time in a quiescent state, as in the case of cream rising upon the surface of milk, and to keep the liquid agitated so as to prevent such separation, to protect the surface from dust, or from the atmospheric effect, and to provide a convenient means for drawing off the liquid from time to time and simultaneously agitating it as stated.

In carrying out this invention, we employ an exterior chamber or vessel A and an interior chamber B which fits approximately within the exterior vessel, the latter being open at the top to receive the interior vessel which is open at the bottom and closed at the top as shown. The top of the interior vessel is provided with an opening, and a screw or other closing cap C, and at the side of the vessel we preferably make a segmental groove or channel D, the upper portion of which is enlarged so as to make a funnel-shaped opening E of sufficient diameter to allow the vessels to be filled with the liquid, without removing the inner one. It is possible, however, to remove the inner one and fill the outer vessel to the proper height, after which the inner one may be introduced so that its lower edge is approximately at or near the bottom of the outer vessel, by removing the cap C and allowing the air to be expelled from the inner vessel when it is introduced into its place.

If the inner vessel is first put into the outer vessel and the filling takes place through the funnel or passage, the cap C is removed to allow the air to escape as the liquid rises within the vessels. The vessels may also be filled by removing the cap C and filling through the opening.

A sufficient space is left around the lower edges of the inner chamber B to allow air to freely pass beneath it and enter the inner chamber when the liquid is drawn off.

F is a discharge cock, the opening into which is situated below the lower edge of the inner chamber B, and as here shown it makes an upward curve, then bends downward again upon the outside, the discharge end being sufficiently lower than the inner end to cause it to act as a siphon. Any vessel to be filled is held under this outer end and raised so high that its upper edge is above the level of the interior end. This allows the vessel to be filled only to that level and prevents overflow.

The operation of our invention is as follows: When it is filled with milk or other liquid, as previously described, to a point near the top of the interior vessel, the cap C is fixed tightly in place. When the cock F is opened, a vacuum is produced by the first flow of the liquid which tends to draw all the liquid out from the annular space between the two chambers and from the passage D until the liquid around the outside reaches the level of the bottom of the inner chamber. The length of the discharge pipe below the bottom of the inner chamber determines the strength of the flow, and the rapidity with which the air enters, and, consequently, the violence of the agitation, within the inner chamber. Air thus passes beneath the edge of this chamber and rises in bubbles to take the place of the liquid as it is withdrawn, and the rising of this air through the liquid constantly agitates the latter to prevent its separation, and in the case of milk, the rising of the richer cream to the top. It is especially adapted for containing milk which is sold in small quantities, and it insures an equality of the milk at all times so that the poorer portion will not be drawn off from the bottom and the richer portion left to the last. The inner chamber being closed and covered, protects the surface of the milk from dust, and also prevents the drying of the cream by contact with the exterior atmosphere, as well as preventing any accumulation of cream upon the surface.

A constant small vacuum is maintained in the upper part of the vessel which is partially overcome by the admission of the air around the lower edges of the inner vessel whenever any of the liquid is drawn out through the discharge cock.

Having thus described our invention, what we claim as new, and desire to secure by Letters Patent, is—

1. In a containing vessel for milk and other liquids, an exterior open-topped chamber, an interior chamber having the closed top and open bottom fitting within the outer chamber and remaining stationary with relation thereto, a means whereby the chambers are filled and the air allowed to escape, means for closing the air escape opening at the top of the inner chamber, after the latter is filled with liquid, and a draw-off at the lower portion of the exterior chamber whereby air is caused to flow in around the bottom of the inner chamber and rise in bubbles through the liquid contained therein, substantially as herein described.

2. An apparatus for agitating and drawing liquids consisting of an open top chamber, a second chamber closed at the top and open at the bottom, and stationary within the outer one with means for admitting air around its lower edges, and a draw-off cock from the outer vessel the inner end of which is below the bottom of the inner vessel, and the discharge end made of a greater length to produce a rapid flow of liquid and influx of air to agitate the contents, substantially as herein described.

3. The two stationary chambers, one fitted within the other, a draw off cock from the outer chamber having its inner end below the open bottom of the inner chamber, an upward curve therefrom and an extension of the outer end below the level of the inner end whereby a strong flow of liquid is produced, and a rapid inflow of air, substantially as herein described.

In witness whereof we have hereunto set our hands.

ADOLPH H. SCHLUETER.
THEODORE A. SCHLUETER.

Witnesses:
GEO. H. STRONG,
S. H. NOURSE.